United States Patent [19]
Campbell et al.

[11] 3,937,848
[45] Feb. 10, 1976

[54] CHIP FRACTURING FROM A FRIED RIBBON

[75] Inventors: Glenn M. Campbell, Minneapolis; Stanley G. Liedman, Anoka, both of Minn.

[73] Assignee: General Mills, Inc., Minneapolis, Minn.

[22] Filed: Apr. 27, 1973

[21] Appl. No.: 355,231

[52] U.S. Cl. ............. 426/439; 426/441; 426/503; 426/808; 426/550; 426/518
[51] Int. Cl.[2] .......................................... A23L 1/01
[58] Field of Search ........... 426/346, 347, 441, 439, 426/440, 438, 512, 518, 549, 550, 618, 637, 559, 560, 625, 640

[56] References Cited
UNITED STATES PATENTS

| | | | |
|---|---|---|---|
| 2,286,644 | 6/1942 | Pringle | 426/438 |
| 3,150,978 | 9/1964 | Campfield | 426/458 |
| 3,259,503 | 7/1966 | Tau | 426/439 |
| 3,278,311 | 10/1966 | Brown | 426/347 |
| 3,282,701 | 11/1966 | Wang | 426/347 |
| 3,297,450 | 1/1967 | Loska | 426/441 |
| 3,451,822 | 6/1969 | Fast | 426/347 |
| 3,539,356 | 11/1970 | Benson | 426/439 |
| 3,545,979 | 12/1970 | Ghafori | 426/347 |
| 3,864,505 | 2/1975 | Hunter et al. | 426/441 |

Primary Examiner—Norman Yudkoff
Assistant Examiner—Martin G. Mullen
Attorney, Agent, or Firm—G. O. Enockson; N. P. Friederichs

[57] ABSTRACT

Method and apparatus for preparing a chip-type snack is disclosed. A dough is prepared and sheeted. An elongated shaped ribbon is cut from the dough sheet. The ribbon is passed through a deep fat fryer and then separated into individual chips by fracturing the ribbon.

9 Claims, 13 Drawing Figures

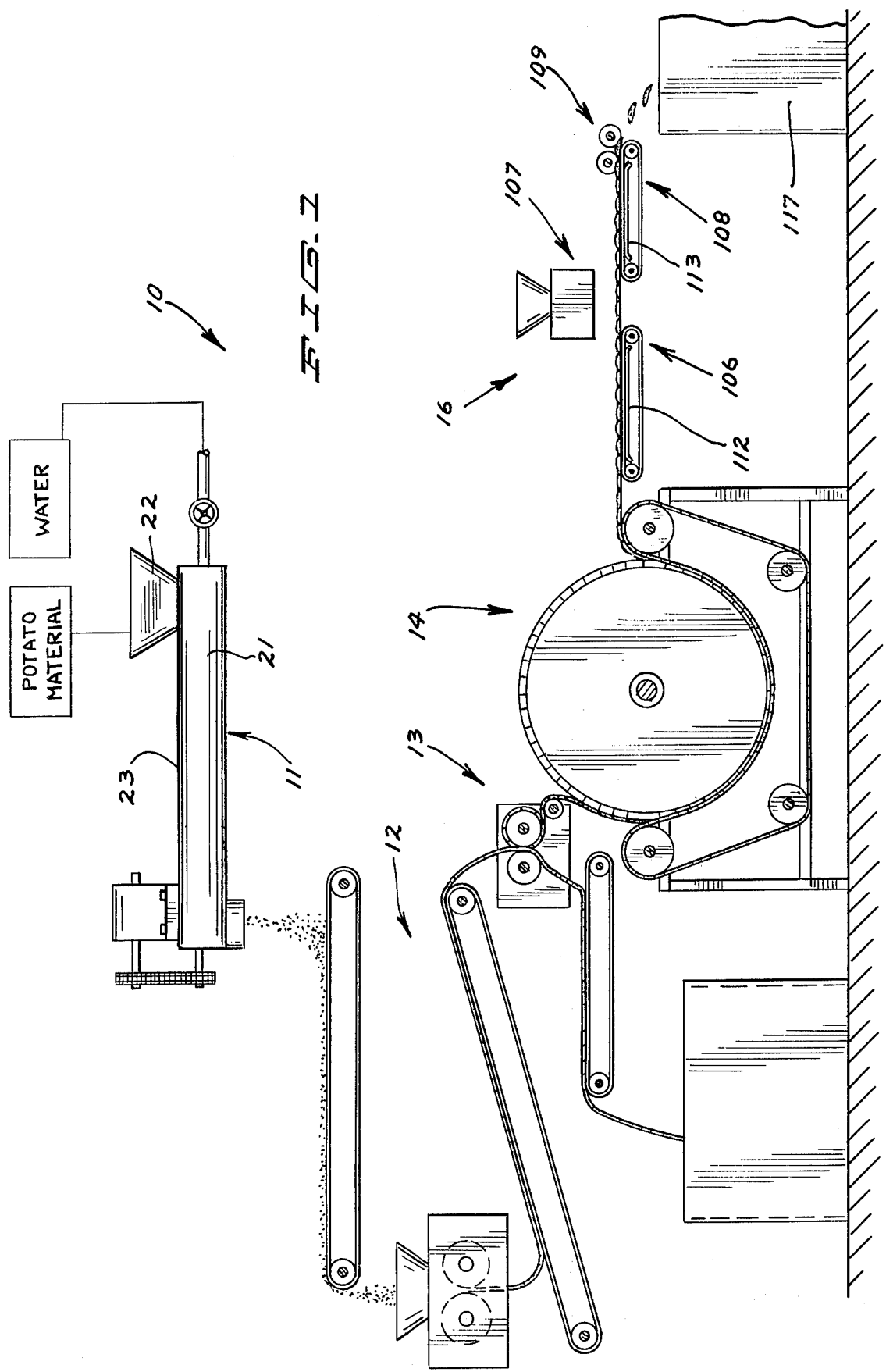

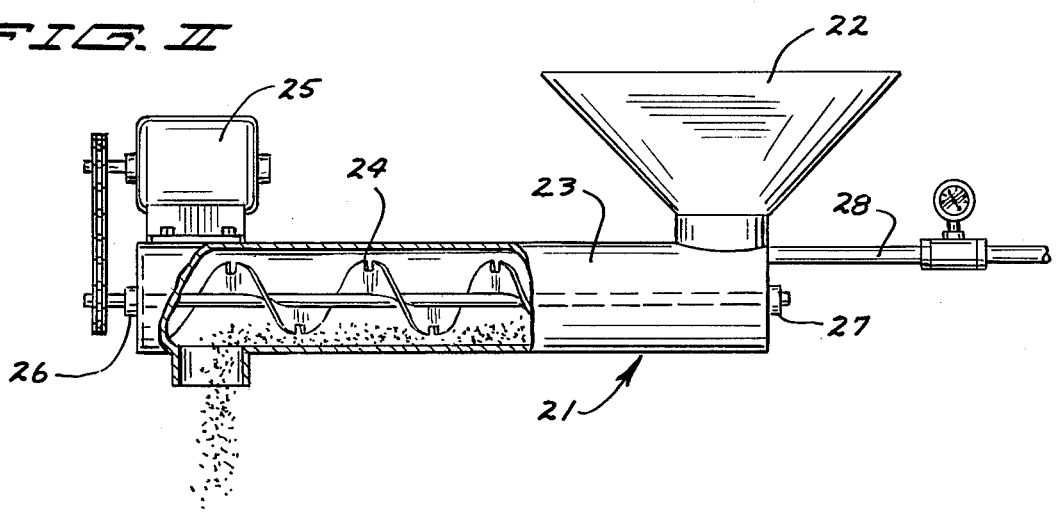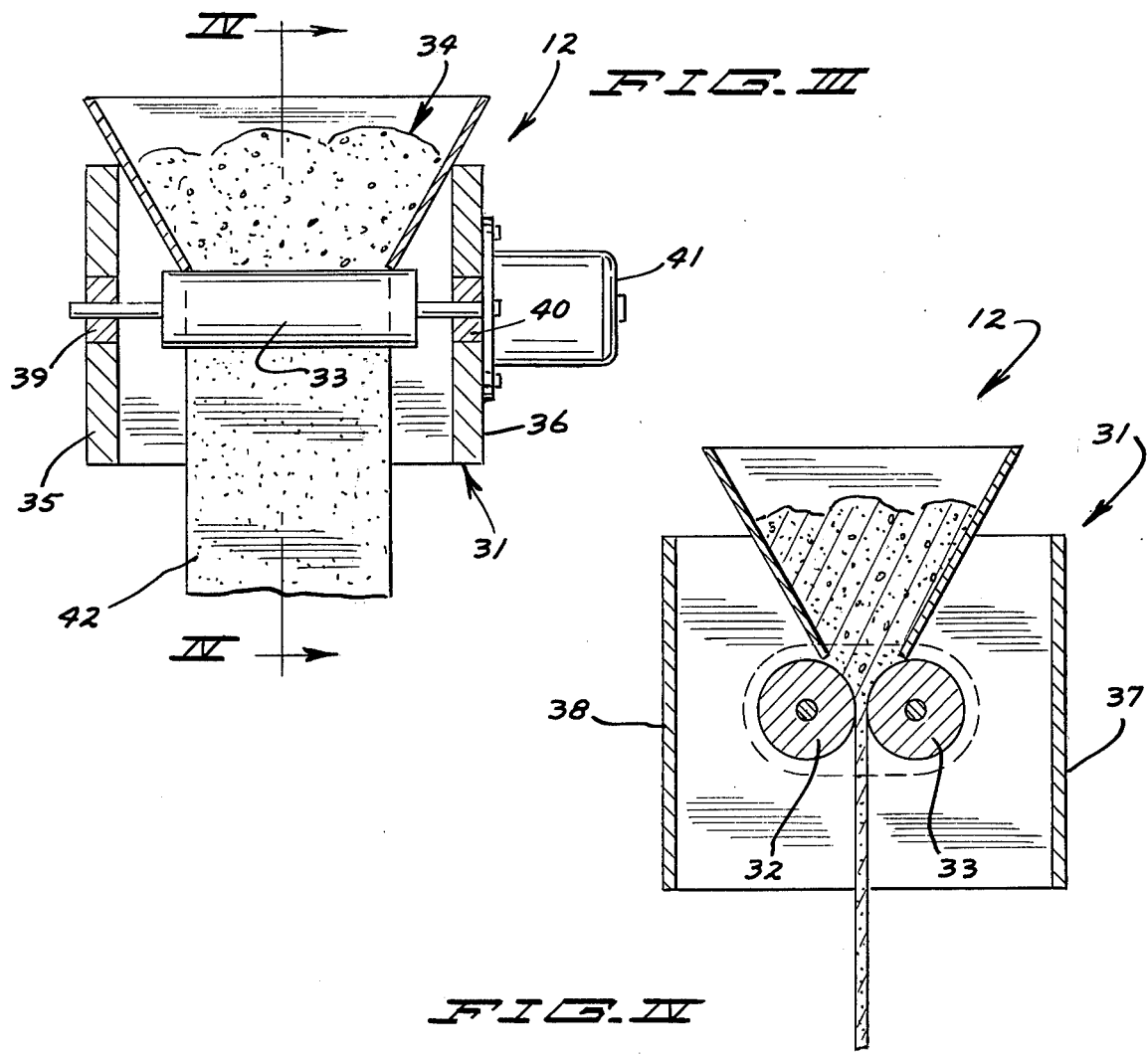

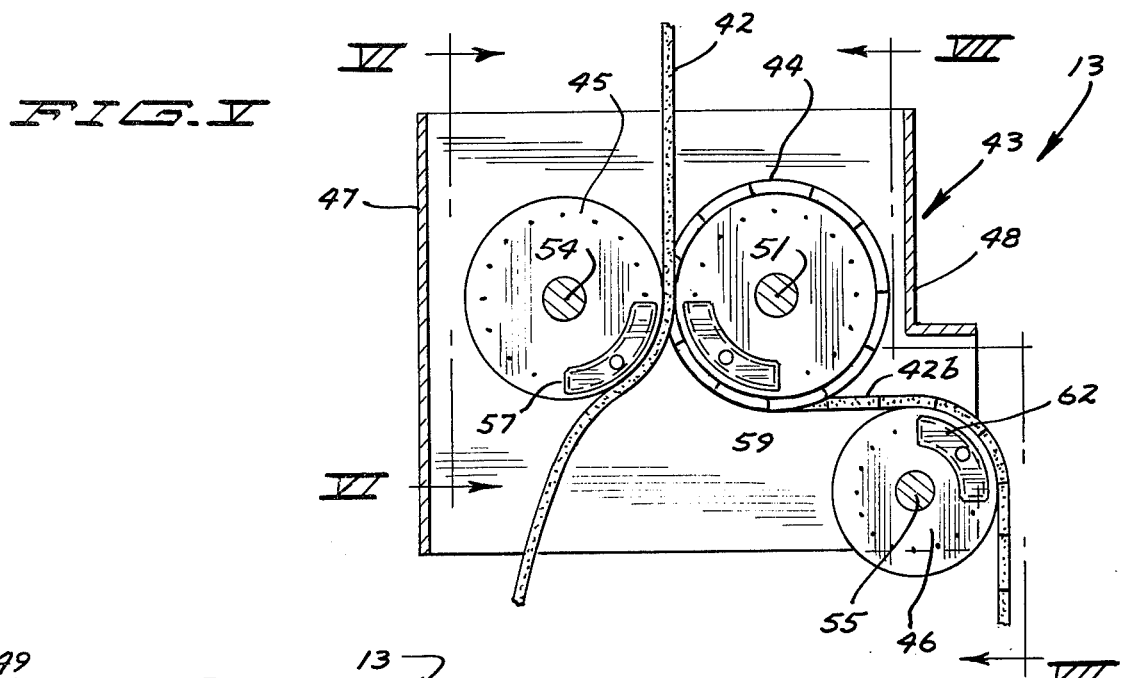
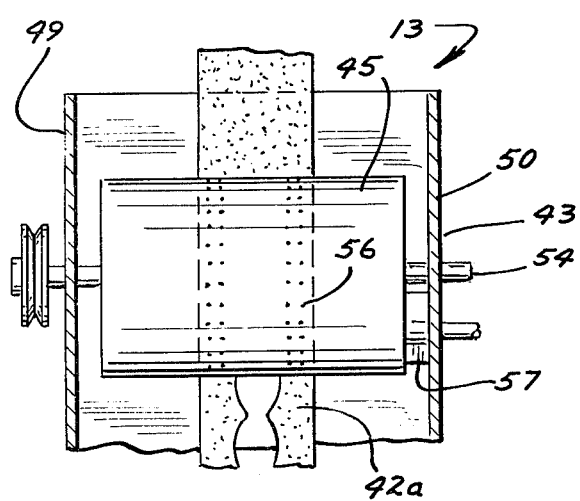
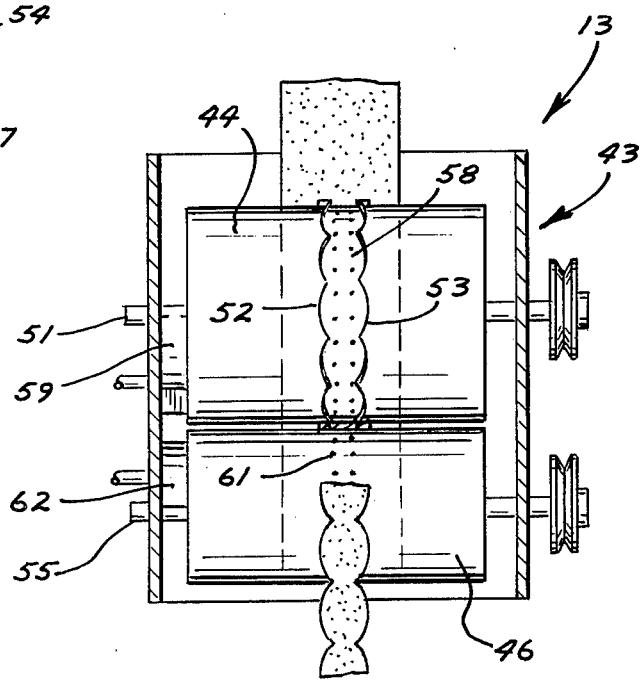

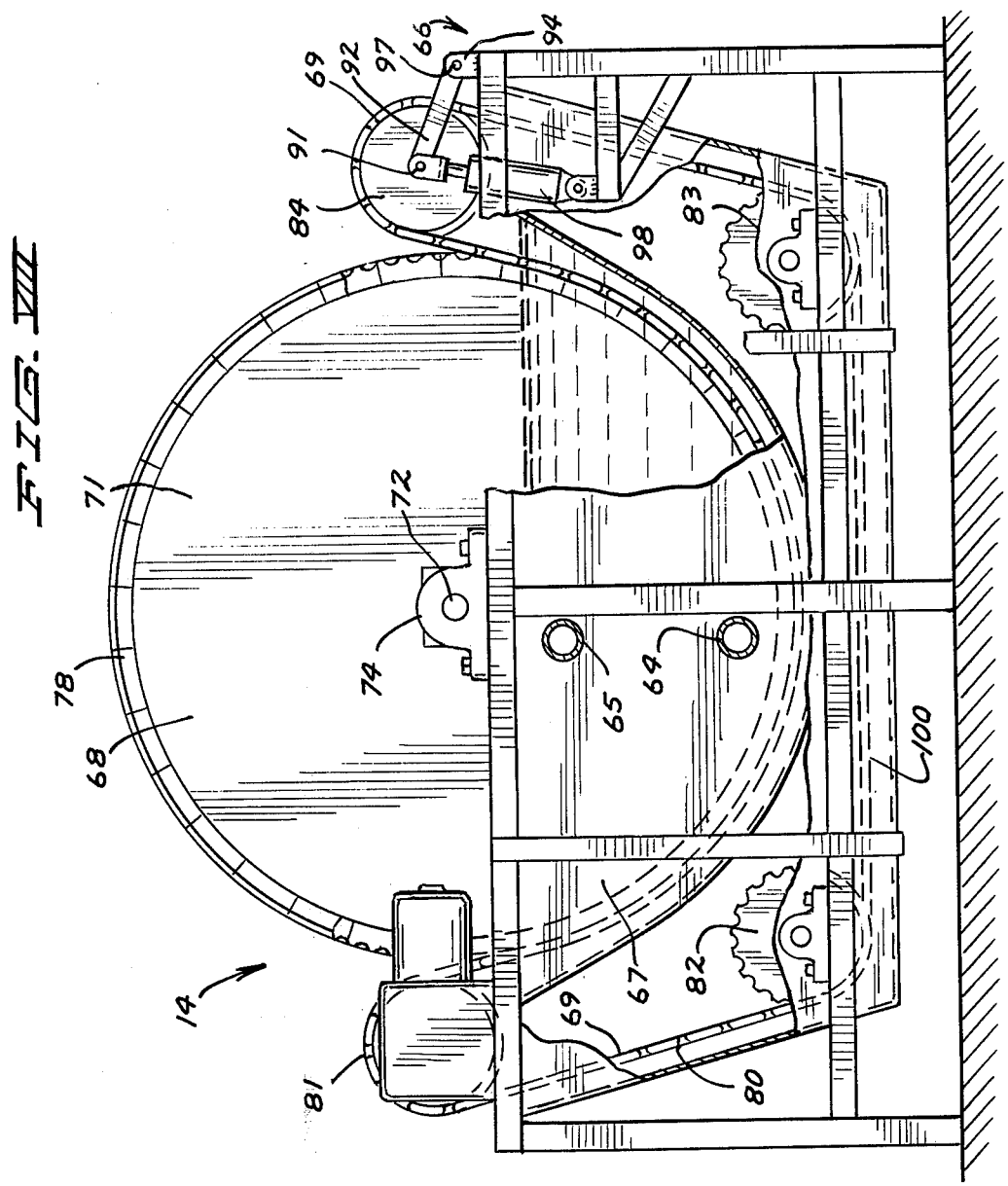
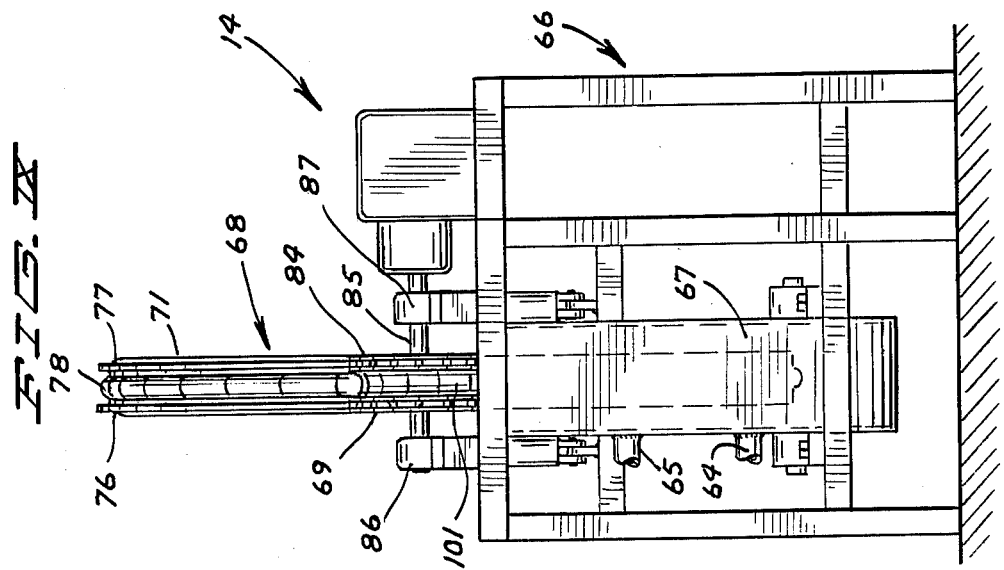

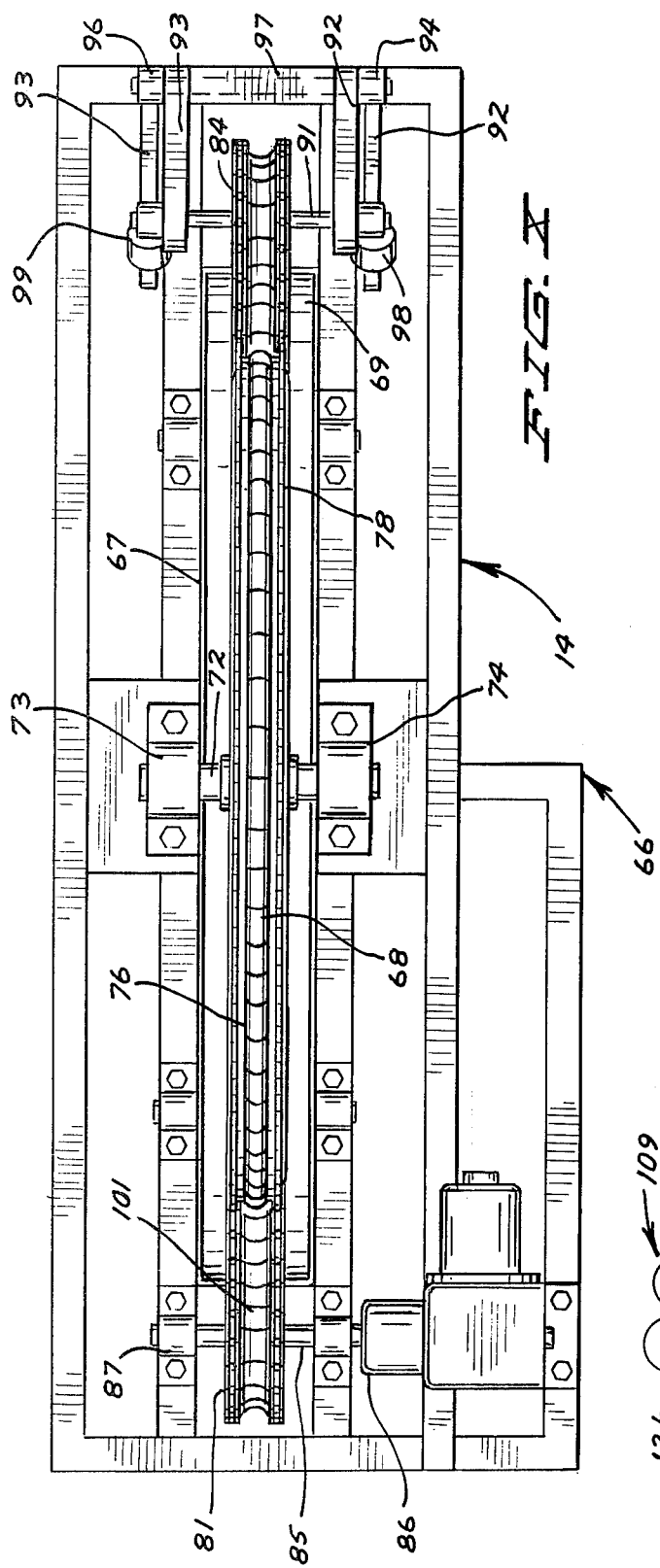
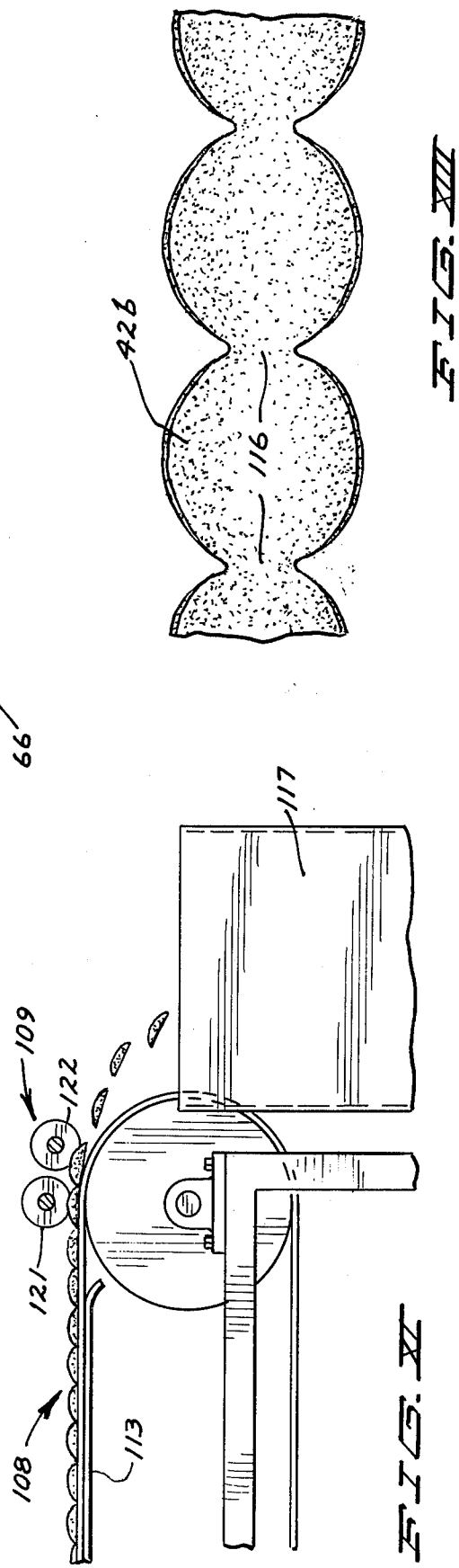

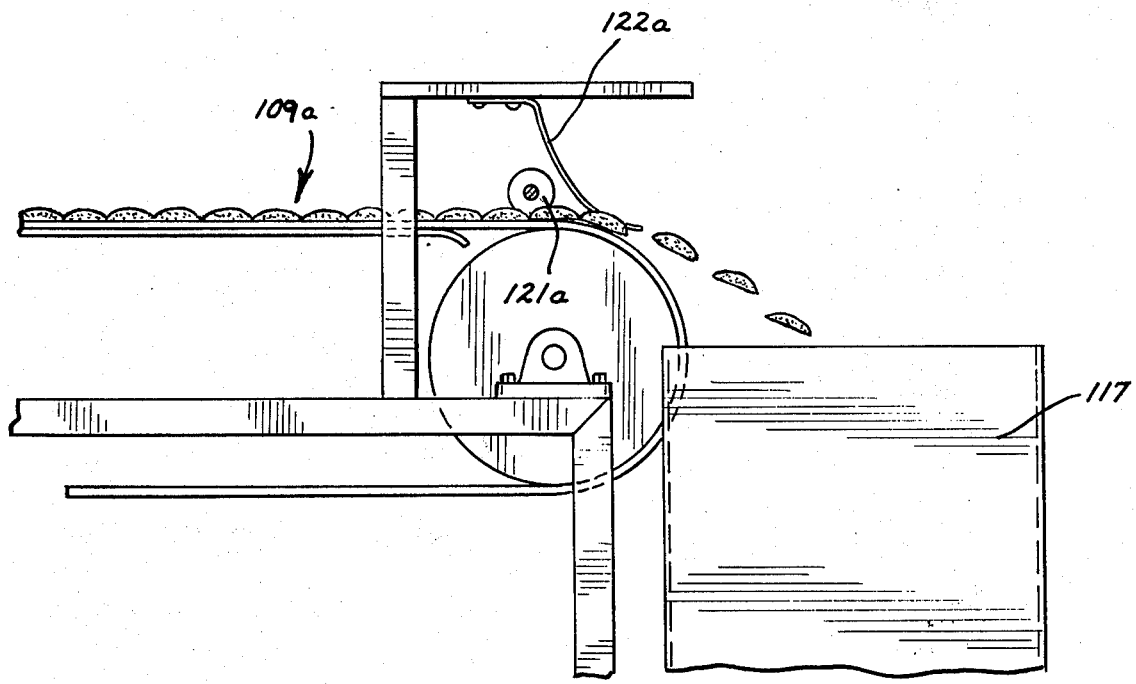
FIG. XII

CHIP FRACTURING FROM A FRIED RIBBON

BACKGROUND OF THE INVENTION

The present invention relates to snack products and more particularly to chip-type snack products.

The food products which are sold in the general category of snack items are many and varied, typically including such things as chips (e.g., potato chips and corn chips), puffs (e.g., corn puffs), etc. Snack iems account for a large volume in the food industry. Generally, snack items are eaten apart from a regular meal and often different snack items are served at the same time. When snacks are served, normally at least one chip-type snack is included. One of the most popular chip-type snacks is the potato chip or fabricated potato chip.

The present invention relates to new method and apparatus for preparing fabricated, shaped chip-type snacks. The present invention will be described primarily with regard to preparation of potato chips; however, it should be recognized that various other types of fabricated chips (such as corn chips or wheat chips) may be prepared using the present invention.

It has been known in the past to prepare chip-type snacks by preparing a dough sheet and cutting individual sections from the dough sheet. The sections are then fried to form chips. A major difficulty has been confronted in controlling the movement of the individual sections through the deep fat fryer. A partial solution has been provided by operating a continuous belt in the upper portion of the fryer which assists in moving the sections through the fryer. Some sections, however, may clump together resulting in unfried or only partially fried chips. Other sections may remain in the fryer too long and become overly fried or burned. The present invention overcomes such problems by moving a continuous ribbon of chips positively through a frying system and then separating the ribbon into individual chips by fracturing the ribbon between chips.

THE PRESENT INVENTION

The method of the present invention includes preparation of a dough material, sheeting and cutting the dough material into a ribbon of dough pieces, frying the ribbon of dough pieces to produce a ribbon of chips and then severing the fried, shaped ribbon into individual chips.

The dough may be prepared from any of various particulate starchy food materials such as potato granules, potato flakes, wheat flour, rice flour, corn grits and the like. The dough, when preparing fabricated potato chips, may be prepared from a mixture of potato flakes and potato granules. Alternatively the dough may be prepared solely from either potato flakes or potato granules. The dough may have various other added ingredients. The total moisture content is such that the dough has satisfactory handling characteristics. In other words, the dough has sufficient cohesiveness to stick together as a sheet and not so much adhesiveness to stick to equipment. Water is added to the particular material in an amount sufficient to form a dough. The total moisture content of the dough may vary somewhat depending on the particular starchyfood material being used but will typically be in the range of 25 to 45 percent. The term "percent" and the like, as used herein, will mean by weight unless otherwise indicated. The preferred moisture level is about 40 percent.

The dough is sheeted to any desired thickness. The thickness typically will be about 0.025 inch; however, the thickness may be as small as 0.010 inch or as great as 0.10 inch. The preferred dough sheet thickness is about 0.015 to 0.06 inch. The dough sheet may be cut into any desired shape of pieces (i.e., unfried chips) such as round or oval. The pieces remain connected by a narrow portion thereby providing a continuous ribbon of pieces. The connecting portion is large enough to permit processing of the ribbon through the fryer and shaper without separation or breakage of the ribbon. The connecting portion is small enough to permit easy separation of the chips after removal from the fryer by fracturing the connecting portion. The connecting portion, for example, may be about one-eighth to three-eighths inch in width and the chips may be about 1 to 2 inches in diameter.

The ribbon is transported through a bath of hot oil to fry the ribbon. The moisture content during frying is reduced, for example, to less than 5 percent. Any type of frying oil may be used such as cottonseed oil, coconut oil, peanut oil and the like. The temperature of the frying oil is sufficient to fry the dough pieces to form fried chips but not so high as to burn the oil (i.e., below the smoke point of the oil). During frying the dough is puffed or expanded and flavor is developed. The dough typically will expand about 100 percent in thickness during frying. In other words, the final thickness of the puffed chip may be about twice that of the unpuffed dough. The amount of expansion may be increased or decreased, if desired, such as by confining the dough during frying. The frying oil may be at a temperature of about 250° to 410°F., preferably about 320° to 380°F., typically 350°F. The frying time will generally be about 5 to 30 seconds, preferably 8 to 20 seconds.

The fried ribbon is pliable immediately upon leaving the fryer and becomes brittle or friable after about 5 to 10 seconds. Although the exact mechanism is not fully known, it is believed that the change from the pliable state to the friable state is a result of two factors, namely, cooling and dehydration. The change appears to be irreversible in the absence of the addition of major amounts of water. The friable chips are then separated into individual chips by applying tension (e.g., bending force) to the ribbon causing a fracture across the connecting portion. In other words, one chip is held while a moment of force is applied to the adjacent chip sufficient to cause a fracture across the connecting portion.

Apparatus suitable for carrying out the present invention is shown in the drawings. In the drawings:

FIG. I shows a schematic view of the apparatus suitable for carrying out the present invention;

FIG. II shows the dough preparation section for the present invention;

FIGS. III and IV show a dough sheeting section;

FIGS. V–VII show a dough cutting section for the present invention;

FIGS. VIII–X show various views of a fryer suitable for use in the present invention;

FIG. XI shows a chip severing section of the invention;

FIG. XII shows another embodiment of the chip severing section of the present invention.

FIG. XIII shows a ribbon of dough pieces prior to frying;

The apparatus 10 (FIG. I) of the present invention may include a mixing section 11, sheeting section 12, cutting section 13, frying section 14, and finishing section 16.

The mixing section 11 may include any type of apparatus suitable for the preparation of a dough such as from dehydrated potato material, typically potato granules, and water. The mixing section 11 may be a continuous auger mixer 21 (FIG. II) or alternatively a paddle mixer. The auger mixer 21 may include a hopper 22, a barrel 23, a cut flight screw 24 and a motor 25. The screw auger 24 may be suitably supported at each end by bearings 26 and 27. The screw auger is rotatably driven by electric motor 25. The potato material may be added to the hopper 22 and is gradually pulled down into the barrel 23 by the screw aauger 24. A water line 28 supplies the desired amount of water to the mixer 21. The auger 24 intimately mixes the potato material and the water to form the dough. The water is present in an amount sufficient to form a dough that will stick together or in other words remain cohesively fused. Preferably, the water is not present in an amount so great as to make the dough adhesive and create sticking problems during processing. The water typically may be present in an amaount of from about 25 to 45 percent, preferably about 40 percent by weight, based on the total weight of the dough. The added moisture is permitted to equilibrate throughout the dough, for example, by providing a residence time for the dough in the mixer of about 5 to 10 minutes.

The dough may be sheeted using any desired sheeting apparatus such as the sheeting section 12 (FIGS. I, III and IV) which may include a support frame 31, a pair of smooth rolls 32, 33 and a hopper 34. The support frame 31 may be prepared from sheet or plate metal and includes a pair of side walls 35 and 36, as well as a front wall 37 and a rear wall 38. The rolls 32 and 33 are rotatably supported in frame 31 such as by bearings 39 and 40. The rolls 32 and 33 may be metal rolls which are rotatably driven by motor 41. The rolls 32 and 33 are spaced to provide the desired thickness of dough sheet. In the preparation of fabricated potato chips, the thickness of the dough sheet may be about 0.02 to 0.03 inch.

The dough sheet 42 may be cut into a ribbon of chips with each chip remaining connected to the adjacent chips, see FIG. XIII. One type of cutting apparatus is a reciprocating punch. Another type of apparatus 13 for cutting the ribbon of chips is shown in FIGS. V–VII and is further described and claimed in U.S. Pat. 3,872,752, filed on even date herewith. The cutting apparatus 13 includes a support frame 43, a cutter roll 44, a smooth roll 45 and a transfer roll 46. The support frame 43 may be constructed of sheet or plate metal and may include a rear wall 47, a front wall 48 and a pair of side walls 49 and 50. The cutter roll 44 may be a metal drum mounted on a shaft 51 which is rotatably supported in suitable bearings (not shown) in walls 49 and 50. The cutter roll 44 may be prepared from a metal drum by machining away the surface thereof to leave a pair of cutting ridges 52 and 53 (FIG. VII). The ridges 52 and 53 have sufficient depth to cut through the dough sheet 42. The smooth roll 45 may be a metal drum mounted on a shaft 54 which is rotatably supported in side walls 49 and 50 such as by bearings (not shown). The smooth roll 45 abuts against the ridges 52 and 53 of roll 44 thereby providing a cutting surface. The transfer roll 46 may be a metal drum mounted on a shaft 55 which is rotatably supported in side walls 49 and 50 such as by bearings (not shown). The rolls 44, 45 and 46 may be driven by an electric motor (not shown). If desired, the rolls 44, 45 and 46 may be provided with vacuum ports for positively gripping of the dough sheet 42. The smooth roll 45, for example, may have vacuum ports 56 for gripping the waste portion 42a of dough sheet 42. A vacuum manifold 57 supplies a vacuum to ports 56 in a conventional manner. The vacuum, of course, is applied only over the zone where gripping of portion 42a is desired. The waste portion 42a may be recycled at any point prior to the sheeting section. Cutting roll 44 may have vacuum ports 58 and a vacuum manifold 59 for gripping the ribbon of dough pieces 42b. The transfer roll 46 may have vacuum ports 61 and a vacuum manifold 62. The vacuum manifolds 57, 59 and 62 may be of conventional design.

The fryer may be of any type through which the ribbon may be passed during frying such as the type shown in U.S. patent application Ser. No. 355,259. The fryer section 14 (FIGS. VIII–X) may include a support frame 66, a frying tank 67, a conveying wheel 68 and a continuous conveying belt system 69. The support frame 66 may be constructed from any structural material such as tubing, angle iron stock and the like such as by welding. The frying tank 67 may be constructed from sheet metal and is secured in frame 66 such as by bolts (not shown).

The tank 67 has an oil inlet pipe 64 for receiving heated oil from any suitable external heater (not shown) and may be returned to the heater by an oil outlet pipe 65 from tank 67. Any conventional frying oil heater may be used. Such heaters are typically of two types, direct external heaters and indirect external heaters. The direct external heater applies heat, such as by a gas flame, directly to a conduit through which the oil is passing. The indirect external heater applies heat to a conduit through which a heat transfer fluid such as steam is passing. The heat transfer fluid and the cooking oil are both passed through a heat exchanger in separate conduits and the cooking oil picks up heat energy from the heat transfer fluid. The indirect external heater is preferred in the present invention since more uniform heat is applied to the cooking oil resulting in less degradation of the oil. The heaters in either case may be of a gas fired type or of an electrical resistance type.

The conveying wheel 68 may include a metal drum 71 which is supported on a shaft 72. The shaft 72 may be rotatably mounted in a pair of bearings 73 and 74 which are secured to support frame 66. The wheel 68 may have a row of gear teeth 76 and 77 at each side (See FIG. IX) for purposes hereinafter described. The wheel 68 further includes a perforated frying surface 78 which may be provided by wire screen or perforated metal sheet. The frying surface 78 may be of any desired shape.

The continuous conveying belt system 69 may include a continuous link chain 80 supported on gear wheels 81, 82, 83 and 84. Gear wheel 81 has a pair of rows of gear teeth spaced substantially the same as gear teeth rows 76 and 77 of wheel 68. Gear wheel 81 is mounted on a shaft 85 which is rotatably supported in bearings 86 and 87. The gear wheels 82 and 83 may be identical to gear wheen 81. The gear wheel 84 may be similar, however, it is mounted in such a manner that it may be pivoted to maintain tension on link chain 80. In other words, gear wheel 84 has a shaft 91 which is rotatably mounted in bearings (not shown) in levers 92 and 93. The levers 92 and 93 are secured to the flanges 94 and 96 of frame 66 by pivot pin 97. A pair of pneumatic or hydraulic-air operated cylinders 98 and 99 are provided for driving the gear wheel upwardly to tighten the chain 80. The cylinders 98 and 99 are secured to the support frame 66 at the lower ends thereof and secured to levers 92 and 93 at the upper ends thereof. The link chain 80 is designed for engagement with the various gear teeth on wheels 68, 81, 82, 83 and 84. Chain 80 further includes a perforated frying surface 101 which mates with surface 78 of wheel 68. The perforated surface 101 may be provided by wire screen or perforated metal sheet which is attached to each of the links of chain 80. The surfaces 78 and 101 may be shaped the same and for example may be flat to provide flat chips. Alternately, the surface 78 may be convex and surface 101 may be concave thereby producing chips having a shaped cross section. If desired, the dough pieces may be fried flat and later shaped.

The surfaces 78 and 101 may be spaced apart typically 0.02 to 0.06 inch when frying a chip having a thickness of 0.02 inch. The perforations typically may be 1/16 inch in diameter and there are sufficient perforations per inch to provide adequate contact of the ribbon with oil during frying. A drip pan 100 may be provided to catch any oil that may drip from the belt system 69.

The finishing section 15 (FIGS. I and XI) may include a conveyor 106, a salter 107, a conveyor 108 and a chip separator or severing section 109. The conveyors 106 and 108 may be conventional continuous belt conveyors especially if handling flat chips. They may be provided with plates such as 112 and 113 (FIG. XI) for supporting the upper reach of the respective belt. In the case of handling chips having shaped cross section, the conveyors preferably are similarly shaped thereby cradling the ribbon of chips. The salter 107 may be of any design suitable for metering out the desired amount of salt or other flavoring onto the row of chips. The chip separator 109 may be any device that impinges against the individual chips thereby resulting in a fracture across the narrow portion 116 (FIG. XIII) between the chips. The chips then fall into a container 117. One preferred embodiment of the severing section 109 is shown in FIG. XI.

Severing section 109 may include a wheel 121 which holds the advancing ribbon of chips against the belt conveyor 108. The severing section 109 further includes a wheel 122 which impinges against the ribbon forcing same downwardly to fracture the connection portion 116. In other words, the lower most portion of wheel 122 is located on a plane that is lower than the surface of belt conveyor 108 thus causing the chips to break or separate at the weakest point which is the connecting portion 116. The wheels 121 and 122 may be free wheeling; however, wheels 121 and 122 preferably are driven such as with an electric motor at a rate slightly faster than the rate at which the ribbon is advancing wheel 121, thus, providing a slight pulling force on the ribbon.

Another embodiment 109a of the severing section is shown in FIG. XII. The severing section 109a includes a wheel 121a which holds the advancing ribbon of chips against the belt conveyor 108a and a finger 122 which forces the chips downward thereby breaking the chips apart. The finger 122a may be made of a spring steel material.

We claim:
1. A process for preparing a chip snack comprising:
    preparing a dough by mixing a starchy food material and water, said dough having high enough moisture content to provide the dough with sufficient cohesiveness to permit sheeting of the dough and less than that amount of moisture that would cause the dough to be adhesive and stick to equipment, the moisture content of said dough being about 25 to 45 percent by weight;
    sheeting the dough;
    cutting the sheeted dough into a ribbon having alternating wide portions and narrow portions;
    frying the ribbon in an oil bath, said ribbon extending from the point at which said ribbon enters the bath to the point at which the ribbon exits the frying bath; and
    then fracturing the ribbon at said narrow portions, said fracturing taking place at least 5 seconds after the ribbon has exited said bath, said ribbon having become friable, thereby separating the fried ribbon at the narrow portions into individual chips.
2. The process of claim 1 wherein said chip snack comprises potato chips.
3. The process of claim 1 wherein said ribbon is fractured by holding one wide portion while applying a moment of force to the adjacent wide portion.
4. The process of claim 2 wherein said starchy food material comprises dehydrated potato material.
5. The process of claim 4 wherein said wide portions are cut substantially round in shape.
6. The process of claim 4 wherein said wide portions are each cut substantially oval in shape.
7. The process of claim 2 narrow portions are about one-eighth to three-eighths inches in width.
8. A process for preparing a chip snack comprising:
    mixing dehydrated particulate potato material and water to form a dough, the moisture content of said dough being between about 25 to 45 percent by weight of the dough;
    sheeting the dough
    cutting the sheeted dough to provide a ribbon including wide portions and narrow portions, said sheeted dough being between 0.01 and 0.10 inches in thickness, said wide portions being between about 1 and 2 inches in diameter and said narrow portions being between about one-eighth and three-eighths inches in width;
    frying the dough ribbon in an oil bath, the ribbon extending from the point at which the ribbon enters the frying bath to the point at which the ribbon exits the frying bath during the frying step;
    aging the fried ribbon at least 5 seconds until the ribbon becomes friable; and
    fracturing the ribbon across said narrow portions to provide fabricated fried potato chips.
9. The process of claim 8 wherein said fracturing is produced by holding one of said wide portions while applying a moment of force to the adjacent wide portion.

* * * * *

UNITED STATES PATENT OFFICE
CERTIFICATE OF CORRECTION

PATENT NO. : 3,937,848
DATED : February 10, 1976
INVENTOR(S) : Glenn M. Campbell & Stanley G. Liedman It is certified that error appears in the above-identified patent and that said Letters Patent are hereby corrected as shown below:

IN THE SPECIFICATION:

Col. 1, line 10; "iems" should be --- items ---, line 61; "particular" should be --- particulate ---.

Col. 3, line 14; "aauger" should be --- auger ---, line 23; "amaount" should be --- amount ---.

Col. 4, line 63; "wheen" should be --- wheel ---.

Col. 6, line 1; "122" should be --- 122a ---.

IN THE CLAIMS:

Claim 4, line 1; "2" should be --- 3 ---.

Claim 7, line 1; "2" should be --- 3 ---, line 1, after the number "2", please insert --- wherein the ---

Signed and Sealed this

Twenty-fourth Day of August 1976

[SEAL]

Attest:

RUTH C. MASON
Attesting Officer

C. MARSHALL DANN
Commissioner of Patents and Trademarks